(12) United States Patent
Rollinger et al.

(10) Patent No.: US 8,312,866 B2
(45) Date of Patent: Nov. 20, 2012

(54) FUEL SYSTEM DIAGNOSIS VIA FUEL PRESSURE SWITCH

(75) Inventors: John Eric Rollinger, Sterling Heights, MI (US); Brien Lloyd Fulton, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1055 days.

(21) Appl. No.: 12/263,082

(22) Filed: Oct. 31, 2008

(65) Prior Publication Data

US 2010/0108029 A1 May 6, 2010

(51) Int. Cl.
*F02M 1/00* (2006.01)
(52) U.S. Cl. ............ 123/510; 123/497; 701/103
(58) Field of Classification Search .......... 123/458, 123/497, 510, 445, 446, 456, 457, 472, 478, 123/479, 495, 511; 701/103–105, 114
See application file for complete search history.

(56) References Cited

U.S. PATENT DOCUMENTS

| | | | | |
|---|---|---|---|---|
| 4,330,238 A | * | 5/1982 | Hoffman | 417/19 |
| 5,406,922 A | | 4/1995 | Tuckey | |
| 5,842,454 A | * | 12/1998 | Miwa et al. | 123/497 |
| 5,850,818 A | * | 12/1998 | Yoshiume et al. | 123/497 |
| 6,609,501 B2 | | 8/2003 | Doane et al. | |
| 6,871,629 B2 | | 3/2005 | Hanson et al. | |
| 7,360,432 B2 | | 4/2008 | Lehtonen | |
| 7,874,281 B2 | * | 1/2011 | Delp et al. | 123/446 |
| 2008/0314364 A1 | * | 12/2008 | Okamoto | 123/458 |

FOREIGN PATENT DOCUMENTS

| | | |
|---|---|---|
| DE | 19614884 | 10/1997 |
| DE | 10146474 | 4/2003 |

* cited by examiner

*Primary Examiner* — John Kwon
(74) *Attorney, Agent, or Firm* — Julia Voutyras; Alleman Hall McCoy Russell & Tuttle LLP

(57) ABSTRACT

An engine system for a vehicle and its method of operation are provided. In one embodiment, a control system is configured to indicate a clogging of a fuel filter based on a period of time that a fuel pressure switch remains in a low pressure state. In some embodiments, the control system may respond to an indicated clogging of the fuel system by limiting one or more of fuel pressure, fuel flow rate, and vehicle speed. By limiting the flow rate and/or the pressure at which fuel is delivered to the engine during conditions when the low pressure fuel sub-system is unable to provide sufficient fuel pressure and/or flow, degradation and/or damage to the fuel system, including the high pressure pump, may be reduced or eliminated.

8 Claims, 5 Drawing Sheets

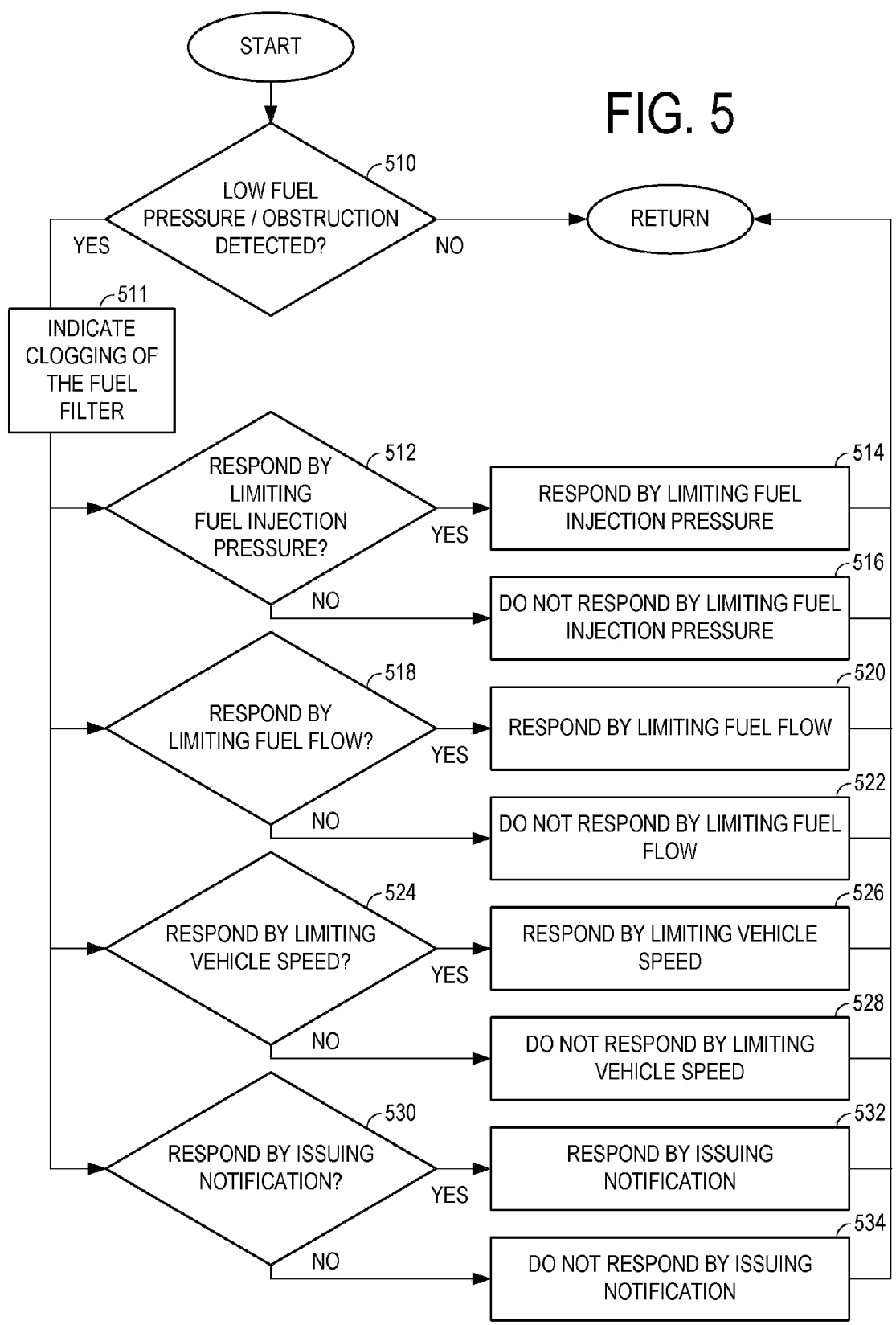

FUEL SYSTEM DIAGNOSIS VIA FUEL PRESSURE SWITCH

BACKGROUND AND SUMMARY

Direct injection internal combustion engines rely on high pressure fuel systems that include a low pressure fuel sub-system. For example, some high pressure fuel systems may include at least a high pressure pump and a low pressure pump which provides fuel of a lower pressure to the high pressure pump. If the low pressure fuel sub-system, including the low pressure pump, is unable to provide sufficient fuel flow and fuel pressure to the high pressure pump, degradation or damage to the high pressure pump or other fuel system components may result. One approach for addressing this issue is to monitor the low pressure fuel sub-system via a fuel pressure sensor.

The inventors of the present disclosure have recognized some issues with the above approach. For example, these fuel pressure sensors may be prohibitively expensive and may be subject to the durability of the fuel pressure sensor. Furthermore, fuel pressure sensors may be limited by their response and/or range sensing characteristics. In order to address these and other issues, the inventors herein have provided an engine system and a method for its operation.

In one embodiment, the engine system includes an internal combustion engine; a fuel passage for supplying fuel to the internal combustion engine; a fuel pump arranged along the fuel passage; a fuel filter arranged along the fuel passage downstream of the fuel pump; a fuel pressure switch arranged along the fuel passage downstream of the fuel filter; and a control system. The fuel pressure switch is configured to switch to a high pressure state in response to a higher fuel pressure within the fuel passage downstream of the fuel filter and switch to a low pressure state in response to a lower fuel pressure within the fuel passage downstream of the fuel filter. The control system is configured to indicate a clogging of the fuel filter based on a period of time that the fuel pressure switch remains in the low pressure state. In some embodiments, the control system may respond to an indicated clogging of the fuel system by limiting one or more of fuel pressure, fuel flow rate, and vehicle speed. Further, the control system may respond to an indicated clogging of the fuel system by issuing a notification to the vehicle operator or service personnel.

This approach when utilized in conjunction with a fuel pressure switch offers a less expensive and more robust alternative to the previous fuel pressure sensor. Furthermore, the fuel pressure switch may not be limited to the extent that the fuel pressure sensor would be with respect to its response and/or range sensing characteristics. By limiting the flow rate and/or the pressure at which fuel is delivered to the internal combustion engine during conditions when the low pressure fuel sub-system is unable to provide sufficient fuel pressure and/or flow, degradation and/or damage to the fuel system, including the high pressure pump, may be reduced or eliminated.

BRIEF DESCRIPTION OF THE DRAWINGS

FIG. 5 shows an example embodiment of a method for responding to a detected low fuel pressure condition or the presence of a fuel flow obstruction.

DETAILED DESCRIPTION

Figure 1:
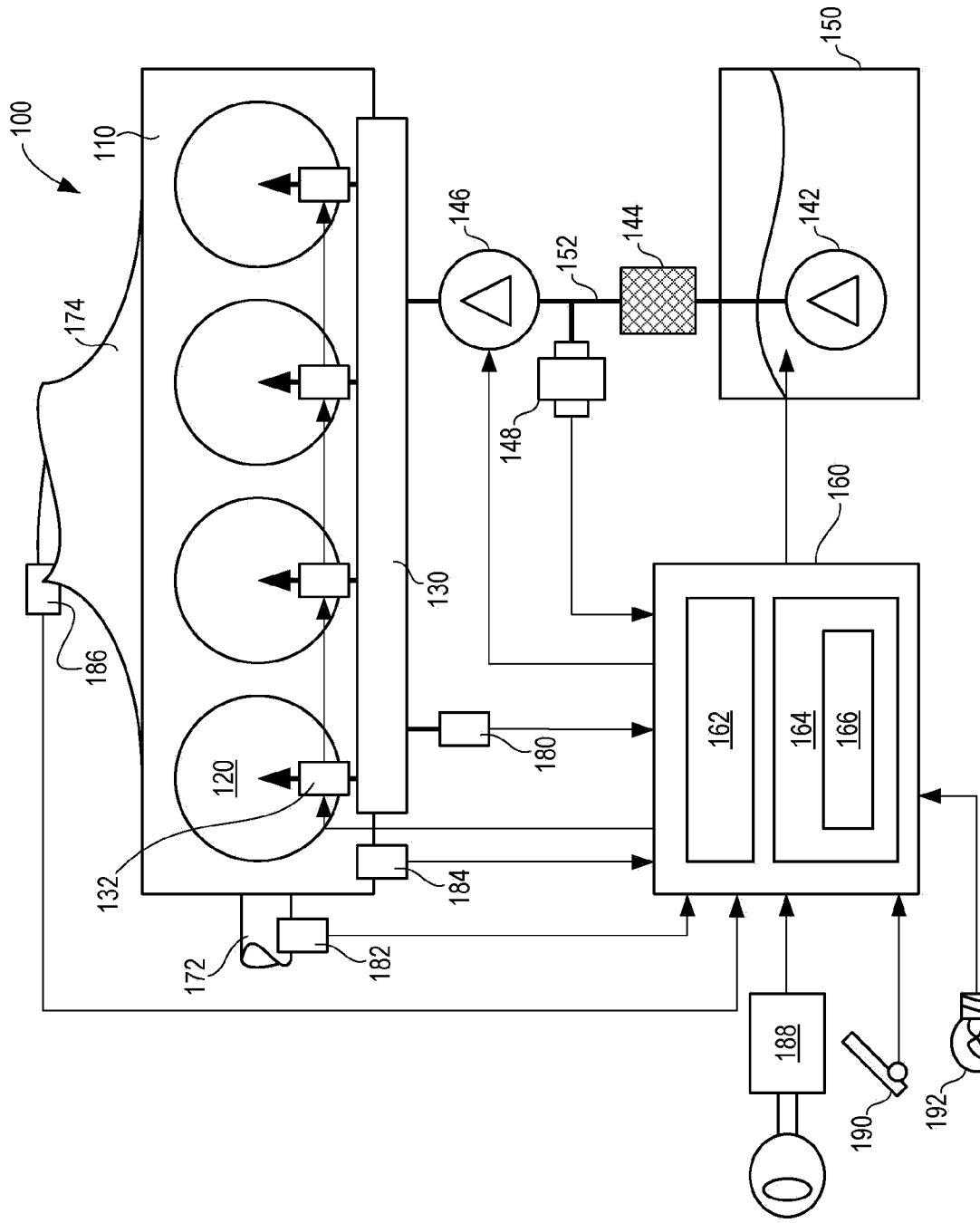
FIG. 1 schematically shows an example embodiment of an engine system.

FIG. 1 schematically shows an example embodiment of an engine system 100, which may comprise part of a vehicle or power generation system. Engine system 100 may include an internal combustion engine 110 having one or more combustion chambers. An example combustion chamber 120 is shown in FIG. 1. Each combustion chamber of internal combustion engine 110 may include a fuel injector for delivering fuel thereto. In some embodiments, each combustion chamber may include a direct fuel injector configured to inject fuel directly into that combustion chamber. For example, combustion chamber 120 may include direct fuel injector 132. In other embodiments, port fuel injectors may be provided as an alternative to or in addition to direct fuel injectors.

Engine system 100 may include a fuel rail 130 that is configured to distribute fuel to the fuel injectors, including direct fuel injector 132. Fuel may be supplied to fuel rail 130 from a fuel tank 150 via a fuel passage 152. Fuel passage 152 may include one or more fuel pumps. For example, fuel passage 152 may include a low pressure pump 142 and a high pressure pump 146. Low pressure pump 142 and high pressure pump 146 may be powered by a crankshaft 172 of internal combustion engine 110 or may be powered by an electric motor. For example, low pressure pump 142 may be powered by an electric motor and high pressure pump 146 may be powered by crankshaft 172 in some embodiments. In other embodiments, high pressure pump 146 may be omitted.

In some embodiments, a fuel filter 144 may be arranged along fuel passage 152 between low pressure pump 142 and high pressure pump 146. Fuel filter 144 may include one or more physical barriers that are configured to remove debris or impurities from the fuel while enabling the fuel to pass through the fuel filter on its way to the internal combustion engine. It should be appreciated that other fuel filters may be arranged at different locations along fuel passage 152, including between the high pressure pump and the fuel rail and/or between the low pressure pump and the fuel stored within the fuel tank.

A fuel pressure switch 148 may be provided along fuel passage 152. In the embodiment shown in FIG. 1, fuel pressure switch 148 is arranged along fuel passage 152 between high pressure pump 146 and fuel filter 144. For example, fuel pressure switch 148 may be arranged at or near a fuel inlet of high pressure pump 146. In this way, fuel pressure switch 148 may provide an indication of fuel pressure within a lower pressure region of fuel passage between high pressure pump 146 and low pressure pump 142, and downstream of fuel filter 144.

In some embodiments, fuel pressure switch 148 may be configured to provide an indication of fuel pressure through a discrete number of states. For example, fuel pressure switch 148 may include a two position switch that is configured to indicate a first position when the fuel pressure received by the fuel pressure switch is less than or equal to a threshold fuel pressure, and is configured to indicate a second position when the fuel pressure received by the fuel pressure switch is greater than the threshold fuel pressure. In other words, the fuel pressure switch may be configured to switch to a high pressure state in response to a higher fuel pressure within the fuel passage downstream of fuel filter 144 and switch to a low pressure state in response to a lower fuel pressure within the fuel passage downstream of the fuel filter.

These first and second positions may be indicated through electrical monitoring of the fuel pressure switch. For example, by monitoring an electrical voltage, resistance, impedance, and/or current across the fuel pressure switch, the fuel pressure that is received by the fuel pressure switch may be identified. Furthermore, in some embodiments, fuel pressure switch 148 may include three or more positions. For example, fuel pressure switch may be configured to indicate a first position when the fuel pressure is less than or equal to a first threshold fuel pressure, indicate a second position when the fuel pressure is greater than the first threshold fuel pressure and less than or equal to a second fuel pressure, and indicate a third position when the fuel pressure is greater than the second fuel pressure.

As a non-limiting example, fuel pressure switch 148 may include a diaphragm which is exposed to fuel flowing through fuel passage 152. This diaphragm may be configured to move or deform between the first position and the second position responsive to the fuel pressure exceeding the fuel pressure threshold. In some embodiments, this diaphragm may be flexible to permit movement between the first position and the second positions responsive to fuel pressure. In other embodiments, this diaphragm may be rigid and may be supported by a spring member or other suitable dynamic member that permits movement between the first position and the second position responsive to fuel pressure. It should be appreciated that these examples are non-limiting, and that other suitable fuel pressure switches may be used.

Engine system 100 may include a control system 160. Control system 160 may include a processor 162 and memory 164. Memory 164 may be configured to hold or store executable instructions 166 that, when executed by processor 162, causes the processor to perform one or more of the various methods or processes described herein.

As one example, control system 160 may be configured to adjust an operating parameter of low pressure pump 142 and high pressure pump 146 to vary a pressure of fuel provided to fuel rail 130 by each pump. As another example, control system 160 may control activation of the fuel injectors, including direct fuel injector 132 to vary an amount of fuel that is injected into the combustion chambers, thereby varying fuel flow to the internal combustion engine. For example, control system 160 may be configured to vary a pulse-width of direct fuel injector 132 in response to operating conditions associated with engine system 100.

Control system 160 may also receive an indication operating conditions associated engine system 100 from various sensors, including a fuel rail pressure sensor 180 which provides an indication of a fuel pressure within fuel rail 130, a crankshaft sensor 182 which provides an indication of engine rotational speed and/or rotational position with respect to crankshaft 172 of internal combustion engine 110, an engine temperature sensor 184 which provides an indication of a temperature of internal combustion engine 110, an exhaust gas composition sensor 186 which provides an indication of exhaust gas composition flowing through exhaust passage 174 of internal combustion engine 110, an ignition sensor 188 which provides an indication of an ignition key position or a user selected setting of any suitable user input device for enabling a user to start the internal combustion engine, an accelerator pedal position sensor 190 which provides an indication of accelerator pedal position, and an ambient temperature sensor which provides an indication of ambient temperature to the control system. In some embodiments, exhaust gas composition sensor 186 may include an exhaust oxygen sensor which can provide control system 160 with an indication of an air-fuel ratio of an air and fuel charge that was combusted at the combustion chambers of internal combustion engine 110.

Figure 2:
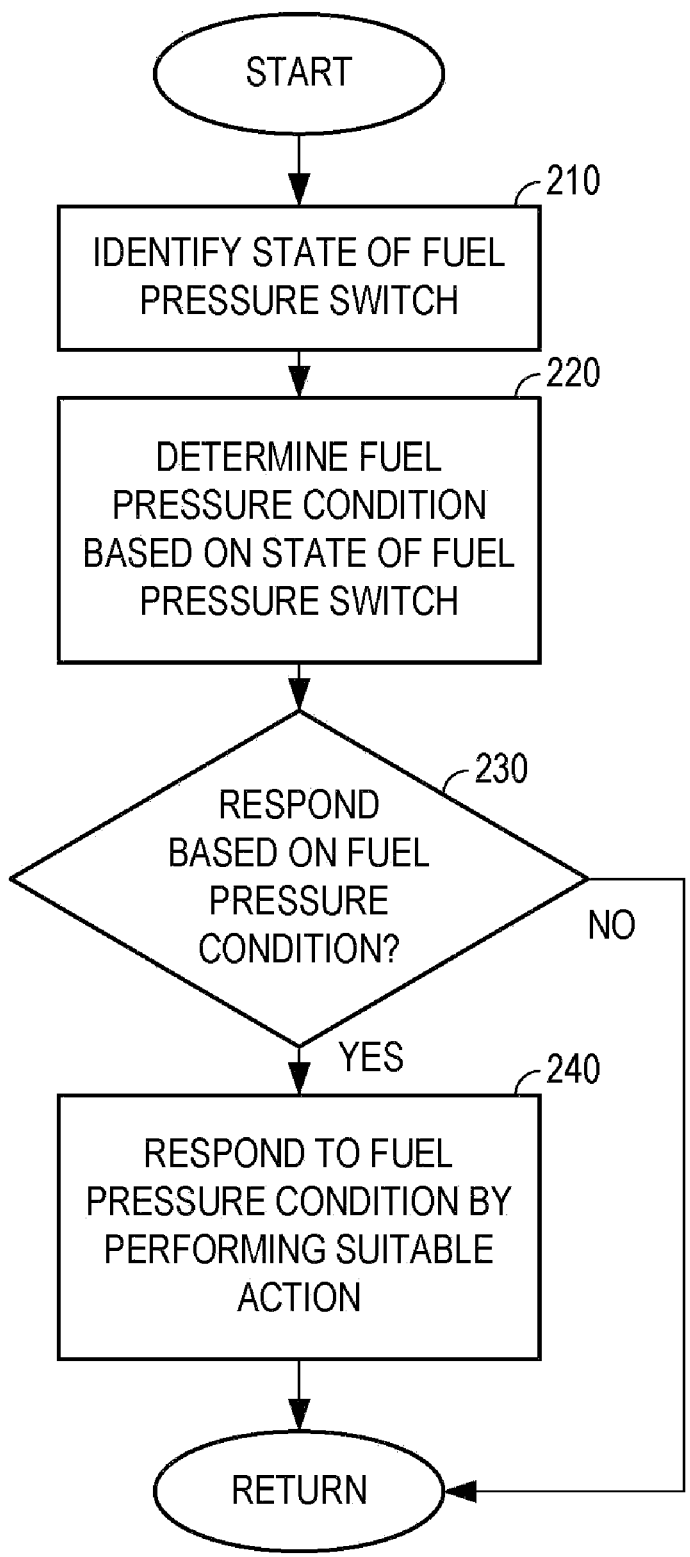
FIG. 2 shows an example embodiment of a method for diagnosing and responding to a low fuel pressure condition at the engine system of FIG. 1.
Figure 3:
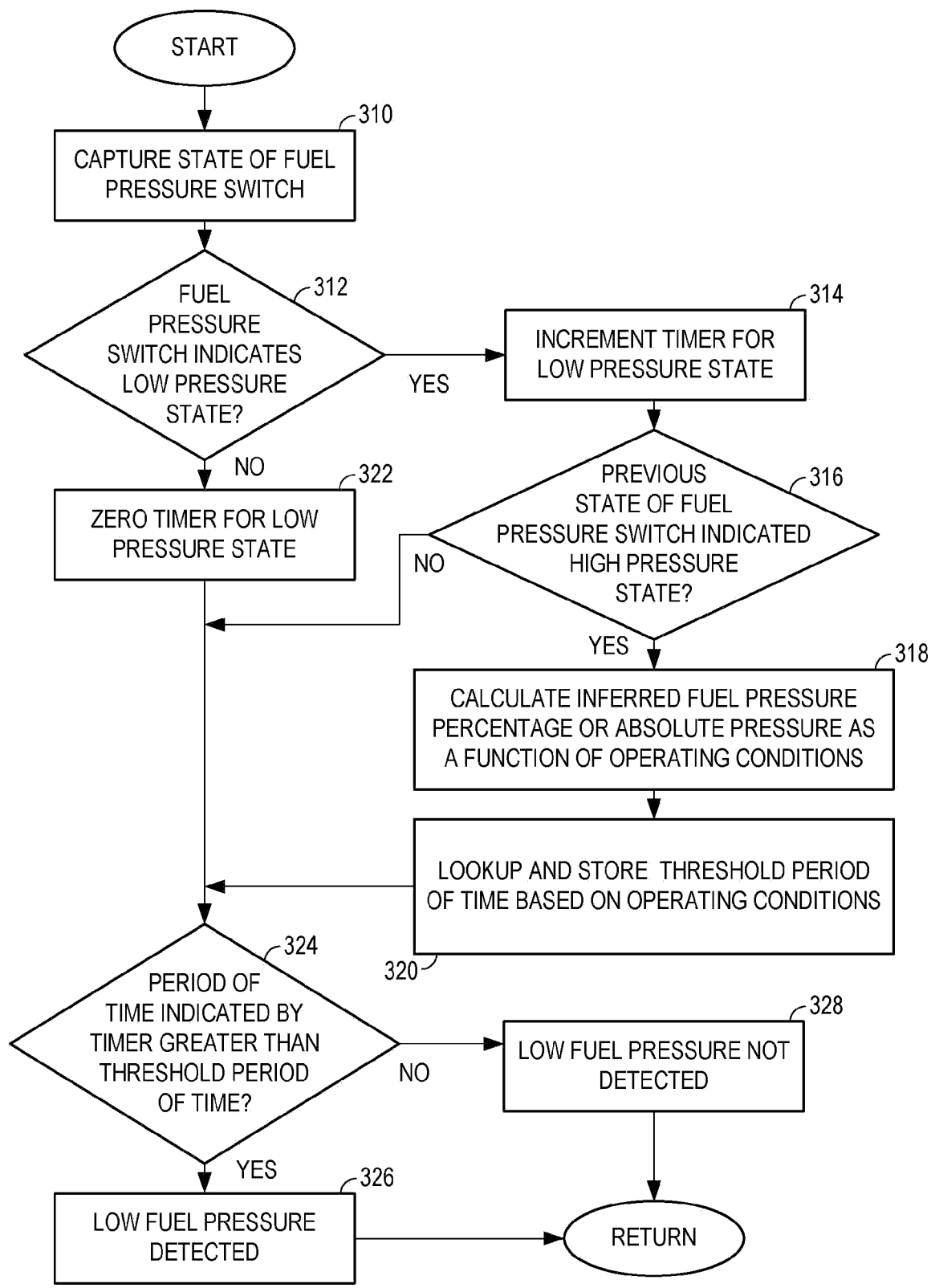
FIG. 3 shows an example embodiment of a method for detecting a low fuel pressure condition.
Figure 4:
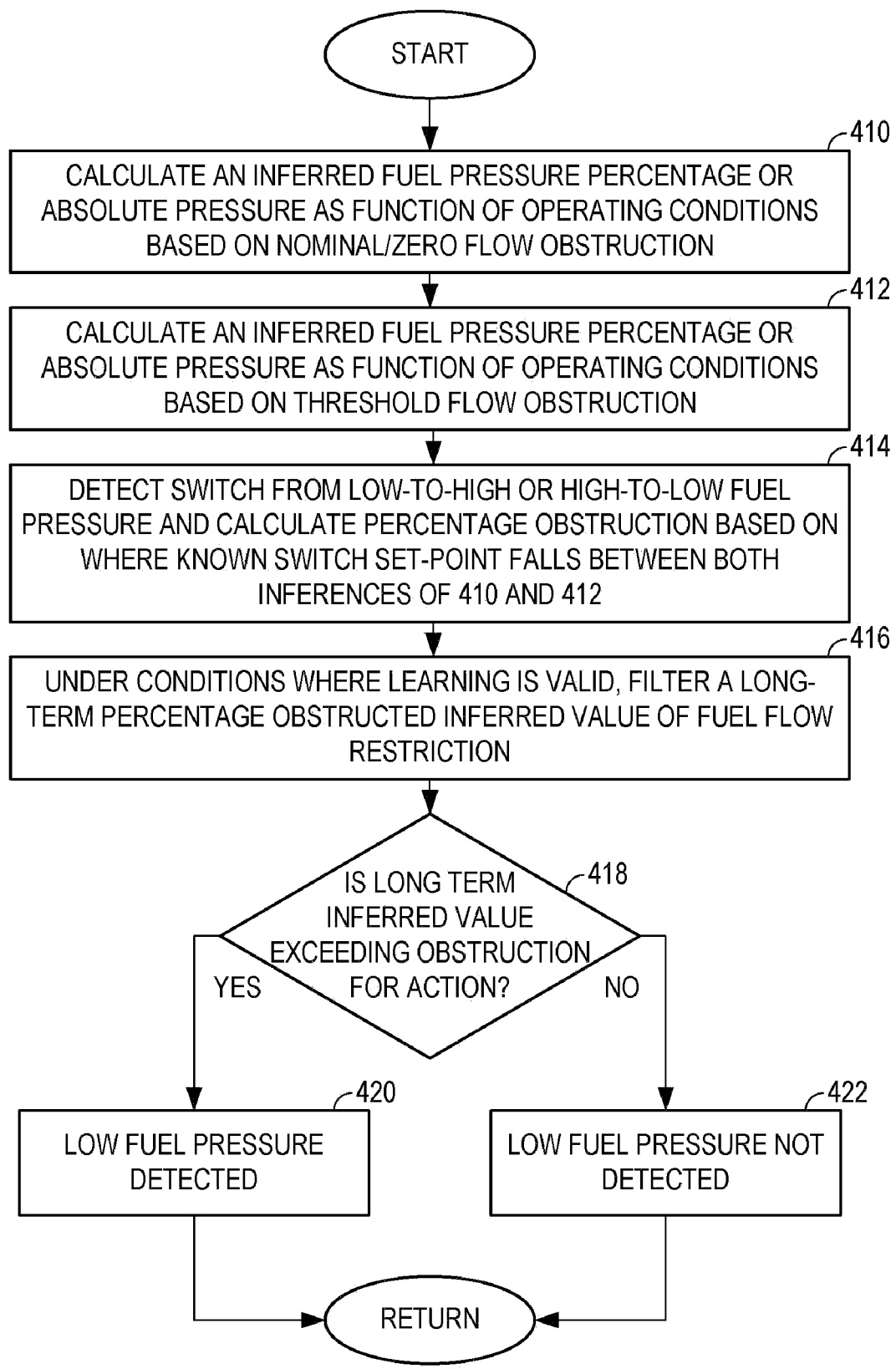
FIG. 4 shows an example embodiment of a method for inferring a fuel flow obstruction.

FIG. 2 shows an example embodiment of a method for diagnosing and responding to a low fuel pressure condition at an engine system, such as engine system 100 of FIG. 1. FIG. 2 depicts a high level process flow of which FIGS. 3, 4, and 5 provide greater detail.

At 210, a state of the fuel pressure switch (e.g., fuel pressure switch 148 of FIG. 1) may be identified. For example, control system 160 may judge whether the fuel pressure switch indicates a first position or a second position by measuring an electrical property of fuel pressure switch 148, including one or more of electrical voltage, resistance, impedance, or current. It should be appreciated that where fuel pressure switch includes three or more positions, control system 160 may judge which of the three positions is indicated by the fuel pressure switch.

At 220, a fuel pressure condition may be determined based on the state of the fuel pressure switch that was identified at 210. In some embodiments, the control system may judge that the fuel pressure switch indicates a low pressure condition based on the position of the fuel pressure switch identified at 210. However, as will be described with reference to FIG. 3, in some embodiments, the control system may further consider a period of time at which the pressure switch has indicated a particular position before determining the fuel pressure condition to account for transient fueling conditions. These transient fueling conditions may arise in response to an increase and/or decrease in fuel flow rate to the internal combustion engine, such as may occur during acceleration of the engine, deceleration of the engine, starting of the engine, or shut-off of the engine.

At 230, it may be judged whether to respond based on the fuel pressure condition determined at 220. For example, depending on the fuel pressure condition determined at 220, the control system may perform one or more actions. These actions may include mitigating actions that are directed to addressing a fuel pressure condition that is lower than a prescribed fuel pressure threshold. These actions may alternatively include restoring actions that are directed to restoring control parameters of the engine system that were previously adjusted through mitigating actions. For example, where the engine system has been repaired or serviced to return the fuel pressure condition to above the fuel pressure threshold, the control system may perform restoring actions.

As such, the control system may judge the answer at 230 to be yes, in some embodiments, if the fuel pressure condition is less than or equal to a fuel pressure threshold, or if the fuel pressure condition is greater than the fuel pressure threshold and mitigating actions have been previously performed responsive to a previous lower pressure condition. In some embodiments, the control system may be configured to respond based on a period of time that the fuel pressure switch remains in the low pressure state. For example, as will be described in the context of FIG. 3, the control system may respond if the period of time that the fuel pressure switch remains in the low pressure state. If the answer at 230 is judged yes, the process flow may proceed to 240. Alternatively, if the answer at 230 is judged no, the process flow may return.

At 240, the control system may respond to the fuel pressure condition determined at 220 by performing one or more suitable actions. If the fuel pressure condition is less than or equal to the prescribed fuel pressure threshold as indicated by the fuel pressure switch, then the control system may perform one or more mitigating actions. Alternatively, if the fuel pressure condition is greater than the prescribed fuel pressure threshold as indicated by the fuel pressure switch and mitigating actions were previously performed by the control system responsive to a lower fuel pressure condition, then the control system may perform one or more restoring actions. Examples of mitigating actions and restoring actions will be described in greater detail with reference to FIG. 5. From 240, the process flow may return or end.

FIG. 3 shows an example embodiment of a method for detecting a low fuel pressure condition. It should be appreciated that the process flow of FIG. 3 may correspond to operations 210 and 220 of FIG. 2. At 310, the state of the fuel pressure switch may be captured by the control system as previously described with reference to operation 210 of FIG. 2. In some embodiments, the control system may monitor the state of the fuel pressure switch on a continuous or periodic basis to determine when or if the fuel pressure switch is switched from the high pressure state to the low pressure state or from the low pressure state to the high pressure state.

At 312, it may be judged whether the fuel pressure switch indicates a low pressure state. For example, the control system may judge whether the fuel pressure switch is currently set to a first position thereby indicating a low pressure state or a second position thereby indicating a high pressure state. If the answer at 312 is yes (e.g., the fuel pressure switch indicates the low pressure state), then the process flow may proceed to 314.

At 314, a timer for the low pressure state may be incremented. For example, the control system may begin counting a period of time that the fuel pressure switch remains in the low pressure state via the timer when the fuel pressure switch switches from the high pressure state to the low pressure state.

At 316, it may be judged whether the previous state of the fuel pressure switch indicated a high pressure state. For example, the control system may store (e.g., in memory) the state of the fuel pressure switch that was captured at 310 for each time increment or select resolution of the timer. By referencing the state of the fuel pressure switch that was captured for the time increment or time increments that precede the current time increment, the control system may identify whether the previous state of the fuel pressure switch indicated the high pressure state or the low pressure state. In other words, the control system may judge at 316 whether a switch from the high pressure state to the low pressure state has just occurred. The process flow may proceed to 318 if the answer at 316 is judged yes.

At 318, an inferred fuel pressure or absolute fuel pressure may be calculated as a function of one or more operating conditions. The calculation at 318 may be performed by the control system based on the current operating conditions in order to identify the extent to which the change in the state of the fuel pressure switch has resulted from a transient fuel demand. These operating conditions may include, but are not limited to one or more of the following: fuel mass injected into the internal combustion engine by the fuel injectors, one or more temperature conditions of the engine system including the fuel rail temperature, the underhood temperature and ambient air temperature, and fuel cut operations (e.g., responsive to driver tip-out), etc.

At 320, the control system may look up and/or store in memory a threshold period of time based on one or more operating conditions. These operating conditions may include the operating conditions utilized at operation 318. As a non-limiting example, the control system may look up a threshold period of time based on a transient fuel pressure decrease due to a transient increase of the fuel demand. For example, for a given transient fuel demand, the control system may retrieve from memory a corresponding threshold time period.

In some embodiments, the control system may be configured to select the threshold period of time based on one or more of the operating conditions described above. For example, the control system may be configured to select a longer threshold period of time responsive to a higher fuel flow rate (or a larger increase of the fuel flow rate) and select a shorter threshold period of time responsive to a lower fuel flow rate (or a small increase of the fuel flow rate). From 320, the process flow may proceed to 324. As another example, the control system may be configured to select a longer threshold period of time responsive to a lower temperature and select a shorter threshold period of time responsive to a higher temperature.

Returning briefly to 312, if the answer is alternatively judged no, the process flow may proceed to 322. At 322, the timer for the low pressure state may be set to zero (or some other prescribed value) in contrast to the incremented timer at 314. From 322, the process flow may proceed to 324. Returning briefly to 316, if the answer is judged no, the process flow may proceed to 324.

At 324, it may be judged whether the time step indicated by the timer is greater than the threshold time period identified at 320. For example, if the timer has been set to zero at 322, then the answer at 324 will likely be judged no. However, if the timer was incremented at 314, then the current time step indicated by the timer may be greater than the threshold time period that was retrieved at 320.

If the answer at 324 is judged yes, the process flow may proceed to 326 where it is determined that a low fuel pressure condition has been detected. Alternatively, if the answer at 324 is judged no, the process flow may proceed to 328 where it is determined that a low fuel pressure condition has not been detected.

FIG. 4 shows an example embodiment of a method for inferring a fuel flow obstruction. At 410, an inferred fuel pressure percentage or absolute fuel pressure may be calculated as a function of one or more operating conditions based on a nominal or zero fuel flow obstruction. This nominal or zero fuel flow obstruction may correspond to a new or substantially unclogged fuel filter (e.g., fuel filter 144). As previously described with reference to operation 318, these operating conditions may include, but are not limited to one or more of the following: fuel mass injected into the internal combustion engine by the fuel injectors, one or more temperature conditions of the engine system including the fuel rail temperature, the underhood temperature and ambient air temperature, and fuel cut operations (e.g., responsive to driver tip-out), etc.

At 412, an inferred fuel pressure percentage or absolute fuel pressure may be calculated as a function of one or more operating conditions based on a threshold fuel flow obstruction. This threshold fuel flow obstruction may correspond to a threshold condition where the control system is configured to indicate a clogging of the fuel filter has occurred. The operating conditions used at 412 to calculate the inferred fuel pressure or absolute fuel pressure based on the threshold fuel flow obstruction may be the same as those used at 410 to calculate the inferred fuel pressure or absolute fuel pressure based on the nominal or zero fuel flow obstruction.

At 414, a switch at the fuel pressure switch may be detected from a low pressure state to a high pressure state or from a high pressure state to a low pressure state, and a percentage fuel flow obstruction may be calculated based on where a known switch set-point falls between both inferences 410 and 412.

At 416, under conditions where learning is valid, a long term percentage obstruction may be filtered as an inferred value of the fuel flow obstruction.

At 418, it may be judged whether the long term inferred value exceeds a threshold obstruction for the control system to respond with an action. If the answer at 418 is judged yes, the process flow may proceed to 420 where it is determined that a low fuel pressure condition has been detected. Alternatively, if the answer at 418 is judged no, the process flow may proceed to 422 where it is determined that a low fuel pressure condition has not been detected.

FIG. 5 shows an example embodiment of a method for responding to a detected low fuel pressure condition or the presence of a fuel flow obstruction as detected via the methods of one or more of FIGS. 3 and 4. The various actions described in FIG. 5 include mitigating actions. These mitigating actions may serve to protect the high pressure pump from wear, degradation, and/or failure that may otherwise occur during the low fuel pressure condition, and may encourage the vehicle or engine system operator to have the engine system serviced.

At 510, it may be judged whether a low pressure condition or a fuel flow obstruction has been detected. In judging whether the low fuel pressure condition has been detected, the control system may utilize the method of FIG. 3. In judging whether the fuel flow obstruction has been detected, the control system may utilize the method of FIG. 4. If the answer at 510 is judged no, the process flow may return. If the answer at 510 is judged yes, then the process flow may proceed to one or more of 512, 518, 524, and 530.

In some embodiments, the control system may, at 511, indicate a clogging of the fuel filter (e.g., fuel filter 144) if a low fuel pressure or fuel flow obstruction is detected. For example, the control system may be configured to indicate a clogging of the fuel filter based on a period of time that the fuel pressure switch remains in the low pressure state during operation of the engine.

At 512, it may be judged whether to respond to the low pressure condition or fuel flow obstruction by limiting a fuel injection pressure. In some embodiments, the control system may be configured to limit the pressure at which fuel is delivered to the internal combustion engine if the clogging of the fuel filter is indicated at 511. The process flow may proceed to 514 if the answer at 512 is judged yes. At 514, the control system may respond by limiting fuel injection pressure. In some embodiments, fuel injection pressure may be limited by opening a pressure relief valve in the fuel system and/or by adjusting an operating parameter of the high pressure pump such as through modulation of the duty cycle of the pump. Alternatively, the process flow may proceed to 516 if the answer at 512 is judged no. At 516, the control system does not respond by limiting fuel injection pressure.

At 518, it may be judged whether to respond to the low pressure condition or fuel flow obstruction by limiting a fuel flow. In some embodiments, the control system may be configured to limit the flow rate at which fuel is delivered to the internal combustion engine if the clogging of the fuel filter is indicated at 511. The process flow may proceed to 520 if the answer at 518 is judged yes. At 520, the control system may respond by limiting fuel flow to the engine. In some embodiments, the control system may adjust an operating parameter of high pressure pump 146 to reduce a rate at which fuel is transported to the fuel rail by the high pressure pump. In some embodiments, the control system may reduce a pulse width of the fuel injectors at higher engine loads and/or engine speeds. Alternatively, the process flow may proceed to 522 if the answer at 518 is judged no. At 522, the control system does not respond by limiting fuel flow to the engine.

At 524, it may be judged whether to respond to the low pressure condition or fuel flow obstruction by limiting vehicle speed. In some embodiments, the control system may be configured to limit the speed of the vehicle to less than a threshold vehicle speed if the clogging of the fuel filter is indicated at 511. The process flow may proceed to 526 if the answer at 524 is judged yes. At 526, the control system may respond by limiting vehicle speed. In some embodiments, the control system may impose a vehicle speed limit on the vehicle operator such that further depression of the accelerator pedal does not cause the vehicle speed to increase beyond the threshold vehicle speed. Limiting vehicle speed may represent another way in which a flow rate of fuel to the internal combustion engine may be limited by the control system. Alternatively, the process flow may proceed to 528 if the answer at 524 is judged no. At 528, the control system does not respond by limiting vehicle speed.

At 530, it may be judged whether to respond to the low pressure condition or fuel flow obstruction by issuing a notification. The process flow may proceed to 532 if the answer at 530 is judged yes. Alternatively, the process flow may proceed to 534 if the answer at 530 is judged no. At 532, the control system may respond by issuing a notification. In some embodiments, the control system may issue a notification to the vehicle operator or operator of the engine system by presenting the notification via a graphical display, dashboard lamp, or other suitable indicator indicated schematically at 192 in FIG. 1. For example, the notification may be configured to notify the operator that the vehicle or engine system is in need of repair or servicing. In some embodiments, the control system may issue a notification by storing an error indicator in memory that may be retrieved from memory by service personnel through a service interface. Alternatively, at 534, the control system does not respond by issuing a notification.

While FIG. 5 describes various mitigating actions that may be performed by the control system in response to detection of a low pressure condition or an obstructed fuel flow path (e.g., clogged fuel filter), it should be appreciated that various restoring actions may be performed by the control system by removing one or more of the limits described in FIG. 5. For example, the control system may be configured to judge the answer at 512, 518, 524, and/or 530 to be no if the fuel filter has been replaced or serviced to remove or reduce the obstruction.

Note that the example control and estimation routines, process flows, and methods included herein can be used with various engine and/or vehicle system configurations. The specific routines, process flows, and methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine system including an internal combustion engine, comprising:
   receiving an indication of a state of a fuel pressure switch arranged along a fuel passage between a low pressure pump and a high pressure pump, the fuel pressure switch including a low pressure state and a high pressure state, the fuel pressure switch configured to switch between the high pressure state and the low pressure state responsive to a fuel pressure within the fuel passage;
   limiting a flow rate at which fuel is delivered to the internal combustion engine if a period of time that the fuel pressure switch remains in the low pressure state exceeds a threshold period of time.

2. The method of claim 1, where limiting the flow rate includes adjusting an operating parameter of the high pressure pump.

3. The method of claim 1, where the engine system includes one or more fuel injectors fluidly coupled with the fuel passage downstream of the high pressure pump, the one or more fuel injectors configured to deliver fuel to the internal combustion engine; and
   where limiting the flow rate includes reducing a pulse width of the one or more fuel injectors.

4. The method of claim 1, where limiting the flow rate includes limiting a vehicle speed to less than a vehicle speed threshold.

5. The method of claim 1, further comprising limiting a pressure at which fuel is delivered to the internal combustion engine by adjusting an operating parameter of the high pressure pump if the period of time exceeds the threshold period of time.

6. The method of claim 1, further comprising selecting the threshold period of time based on an operating condition of the engine system.

7. The method of claim 6, where the operating condition includes a temperature of the engine system.

8. The method of claim 6, where the operating condition includes one or more of an amount of fuel delivered to the internal combustion engine or a rate of change of the amount of fuel delivered to the internal combustion engine.

* * * * *